No. 711,847. Patented Oct. 21, 1902.
A. F. GRIFFITHS.
LOG RAFT.
(Application filed July 8, 1902.)
(No Model.)
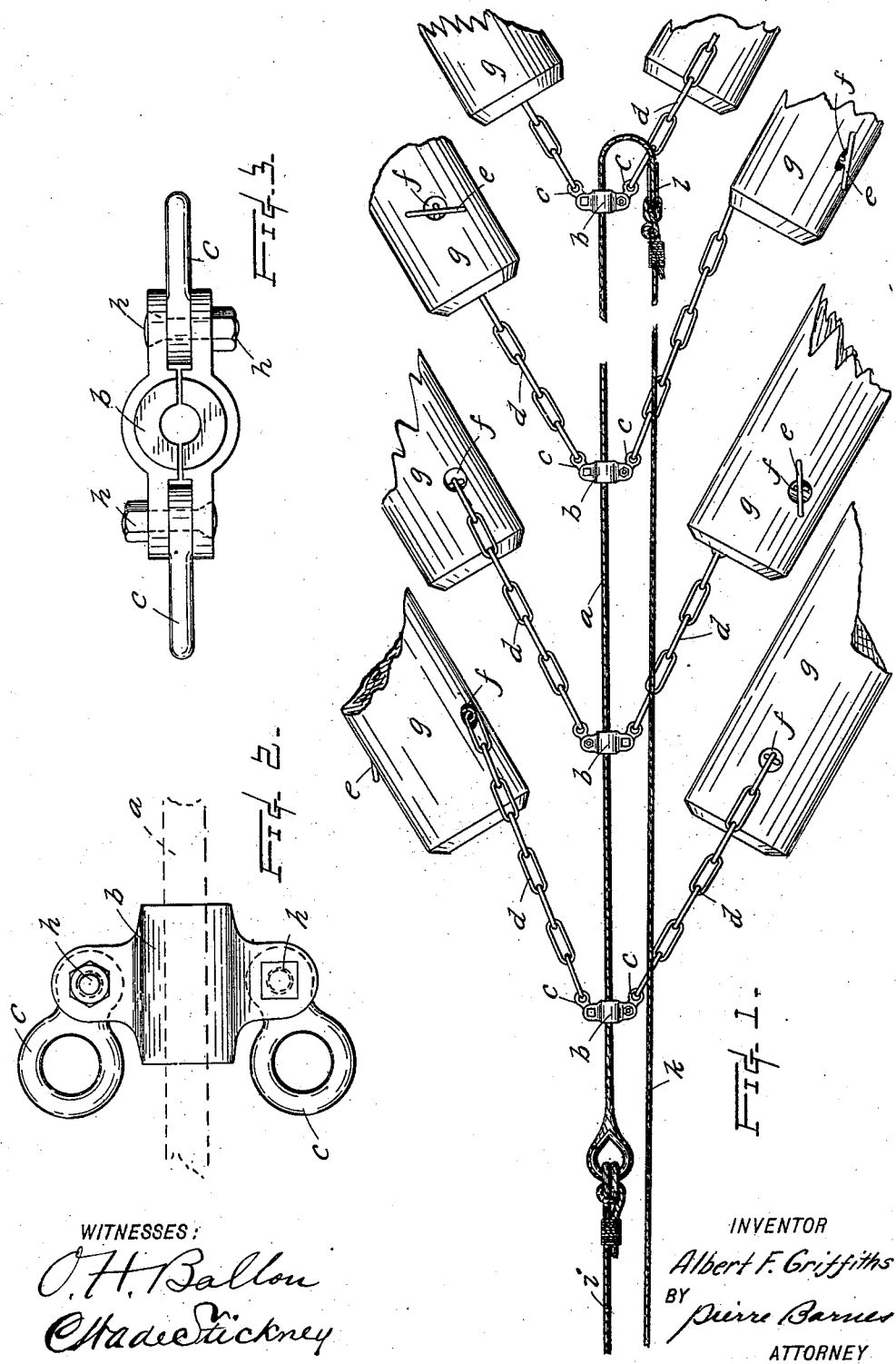
WITNESSES:
O. H. Ballou
C. Hade Stickney
INVENTOR
Albert F. Griffiths
BY
Pierre Barnes
ATTORNEY

UNITED STATES PATENT OFFICE.

ALBERT F. GRIFFITHS, OF VICTORIA, CANADA.

LOG-RAFT.

SPECIFICATION forming part of Letters Patent No. 711,847, dated October 21, 1902.

Application filed July 8, 1902. Serial No. 114,840. (No model.)

*To all whom it may concern:*

Be it known that I, ALBERT F. GRIFFITHS, a subject of the King of England, residing at Victoria, in the Province of British Columbia, Canada, have invented certain new and useful Improvements in Log-Rafts, of which the following is a specification, reference being had therein to the accompanying drawings.

This invention relates to the rafting of logs or the like for towing.

It is common to construct rectangular log-rafts where the several logs thereof are secured by driving "dogs" therein, through which chains are passed, and provided with "boom-sticks" tied end to end to inclose the same. These rafts are towed by a hawser bent to the bight of a bridle-line having its ends secured to or near the forward corners of the raft.

Under the conditions prevailing in rough waters the aforesaid manner of constructing and towing rafts is objectionable, inasmuch as they are easily broken up at considerable loss to the owner, besides the liability of the scattered logs doing great mischief to navigable vessels.

I have devised a manner or means of overcoming the objectionable features above referred to by providing a flexible construction of raft adapted to the roughest bodies of water and which is so assembled and connected together and with the towing-hawser as to reduce the chances of loss to a minimum.

In the accompanying drawings, where like letters of reference indicate corresponding parts in the three views, Figure 1 is a plan view of a system and apparatus embodying my invention. Fig. 2 is an enlarged plan view of the preferred form of gripping device or clip, and Fig. 3 is an end view of the same.

In the said drawings, the letter $a$ represents a main or draw line, preferably a wire cable, and may be of any suitable length or number of lengths connected together, according to the quantity of logs rafted. Attached at intervals along the main line are a number of clips $b$, (see Figs. 2 and 3,) having two oppositely-disposed laterally-projecting wings $c$, to which are secured lines $d$, preferably chains, provided with toggles $e$ upon their outer ends, which are passed through holes $f$ of the logs $g$ and securely engage therewith, as shown. The said clips are made with internal corrugations corresponding to the lay of the cable-strands, so that when clamped in position the strain upon the cable is equalized. I prefer to make the clip-wings $c$ separate from the clip-body and connected thereto by passing the clamp-screws $h$ through holes or eyes thereof. A hawser $i$ is secured to the leading end of line $a$, and a supplemental line $k$ connects the tail end $l$ of the said main line with the towing vessel, which ordinarily would lie slack or loosely upon the raft; but in the event of any breakage, either of the said hawser or of the main draw-line, it would be used for towing. Where an unusually long tow is made up, buoyant bodies may advantageously be positioned at intervals along the main line to prevent the submergence thereof. The main line $a$ may, if desired, be made up of a number of logs connected end to end by chains; but I find that cables give the best results in rough waters.

The advantages obtained by the use of my invention are obvious from the foregoing description and is perfectly adapted for the purposes intended—namely, flexibility of construction and adaptability to any length of haul—particularly on rough seas.

Having described my invention, what I claim as new, and desire to secure by Letters Patent, is—

1. The means for rafting logs to be towed, comprising a central longitudinal draw-line, lines arranged in pairs along the said draw-line and adapted to have their outer ends severally secured to logs, and devices for securing said lines to the draw-line, as and for the purpose described.

2. The single line and its connection with a vessel, in combination with means to connect logs or the like to the said line upon both sides thereof, said log connections being disposed in pairs as and for the purpose set forth.

3. The combination with a central line, clip device adapted to be rigidly secured to said line, two separate chains each detachably secured at one end to the said clip device and having a toggle at its opposite end, for the purposes set forth.

4. In combination, a central draw-line, connection between each end and a vessel, clips clamped to said central line, two chains each secured at one end to each of said clips, and a toggle upon the outer end of each of said chains, as and for the purposes set forth.

5. The combination in a log-raft with a central line $a$, and chains $d$, of clips $b$ adapted to be rigidly secured to said line and provided with laterally-projecting wings $c$, for the purpose set forth.

In testimony whereof I affix my signature in presence of two witnesses.

ALBERT F. GRIFFITHS.

Witnesses:
PIERRE BARNES,
JOHN N. PERKINS.